April 2, 1963     F. J. ROSATO ETAL     3,083,578
INERTIAL SENSOR
Filed Aug. 31, 1959     7 Sheets-Sheet 1

INVENTORS
GEORGE A. BIERNSON
FRANK J. ROSATO
BY
*James E. Olson*
ATTORNEY

April 2, 1963  F. J. ROSATO ETAL  3,083,578
INERTIAL SENSOR
Filed Aug. 31, 1959  7 Sheets-Sheet 2

INVENTORS
GEORGE A. BIERNSON
FRANK J. ROSATO
BY
*Spencer E. Olson*
ATTORNEY

VIEW RELATIVE TO GIMBAL

VIEW RELATIVE TO ROTOR

April 2, 1963   F. J. ROSATO ETAL   3,083,578
INERTIAL SENSOR
Filed Aug. 31, 1959   7 Sheets-Sheet 5

INVENTORS
GEORGE A. BIERNSON
FRANK J. ROSATO
BY
*Spencer E. Olson*
ATTORNEY

April 2, 1963   F. J. ROSATO ETAL   3,083,578
INERTIAL SENSOR
Filed Aug. 31, 1959   7 Sheets-Sheet 6

Fig. 13

INVENTORS
GEORGE A. BIERNSON
FRANK J. ROSATO
BY
*Spencer E. Olson*
ATTORNEY

INVENTORS
GEORGE A. BIERNSON
FRANK J. ROSATO
ATTORNEY

United States Patent Office 3,083,578
Patented Apr. 2, 1963

3,083,578
INERTIAL SENSOR
Frank J. Rosato, Lexington, and George A. Biernson, Concord, Mass., assignors to Sylvania Electric Products Inc., a corporation of Delaware
Filed Aug. 31, 1959, Ser. No. 837,068
31 Claims. (Cl. 73—504)

This invention relates generally to inertial sensors, and more particularly to a device for measuring angular rate of rotation with respect to inertial space.

The measurement of angular rate of rotation of a body with respect to inertial space is an essential function in such areas as inertial navigation, space stabilization, fire control systems, and the like. Heretofore, the gyroscope has been the usual device for performing this measurement. As is well known, the gyroscope employs a spinning rotor journaled within a frame, called a gimbal. The spinning rotor applies a torque to the gimbal proportional to the angular rate of rotation of the gimbal with respect to inertial space, this torque being detected either directly or indirectly. Modern applications of gyroscopes, particularly the inertial navigation application, have imposed stringent accuracy requirements on the device; and these requirements have been difficult to achieve because static friction and unbalance of the gimbal produce torques which tend to mask the small gyroscopic torque applied to the gimbal by the rotor. In an effort to realize the required accuracy, extremely delicate and expensive techniques have been employed to reduce static friction and unbalance torques; but with the demands for gyro accuracy continually increasing, these techniques are reaching their limit.

It is a primary object of the present invention to produce an instrument for measuring angular rates which is not subject to the accuracy limitations of the gyroscope.

Another object of the invention is to provide an instrument for measuring angular rates having an accuracy at least equal to that of present day gyroscopes but of less expensive construction.

Another object of the invention is to provide an instrument for measuring angular rates which is relatively rugged in construction and simple to manufacture.

Briefly, these objects are attained by an instrument employing a spinning rotor which carries a fluid, preferably a heavy liquid such as mercury, journaled for rotation in a gimbal. When the gimbal is moved with respect to inertial space, oscillating Coriolis forces are developed within the fluid, and these oscillating forces are detected to provide a measure of the angular rate of rotation of the gimbal with respect to inertial space. Since the only moving element on the rotor is fluid, there is no static friction; and since the Coriolis force is an oscillating phenomenon, it can be detected with a very high degree of accuracy with simple instruments. Consequently the invention is essentially immune to the effects which limit the accuracy of the gyroscope. The oscillating Coriolis forces generated within the fluid are converted into oscillating electrical signals. Although vibration of the rotor in its bearings may tend to produce signals which mask the Coriolis signal, with a suitable balanced configuration the signals due to vibration may be eliminated.

The principle on which the invention is based has long been known, a device employing oscillating Coriolis force having been constructed by the Hungarian physicist Eotvos in the latter part of the 19th century. The following account of his experiment is contained in "The Variational Principles of Mechanics," by Cornelius Lanczos, page 102, University of Toronto Press, 1949: "The existence of the vertical component of Coriolis force can be demonstrated by the ingenious experiment of the Hungarian physicist Eotvos, who took a chemical balance and rotated it with constant angular velocity about a vertical axis after taking away the two pans of the balance. The beam of the balance rotates in a horizontal plane, a particle of the right beam and a symmetrically situated particle of the left beam having equal velocities in opposite directions. The Coriolis force acts up and down and produces a periodic torque on the beam which brings the balance into forced vibration. (The maximum of the torque occurs when the beam is parallel to the meridian; while in passing the east-west direction, the torque becomes zero.) Although the effect is very small, it is measurable by resorting to the resonance principle and letting the period of rotation coincide with the period of oscillation of the free balance."

The principle applied by Eotvos in this experiment has more recently been utilized in instruments for measuring angular rate. French Patent No. 1,008,538 and a corresponding U.S. patent, No. 2,605,093, describe an instrument, called a gyrometer, which employs a number of rotating blades and measures the oscillating Coriolis forces on the blades by detecting the deflections of the blade tips. A similar device, called a "gyro vibrator," was described in a paper by D. M. Diamantides which appeared in the IRE Transactions on Aeronautical and Navigational Electronics, March 1959, pages 16–23. The gyro vibrator carries a pivoted member within a spinning rotor and measures the Coriolis forces generated within that member by detecting its oscillation with respect to the rotor. The accuracy of these prior-art instruments which utilize oscillating Coriolis forces are limited because they detect the Coriolis forces within mechanical members, which are subject to static friction and hysteresis.

Further objects, features, and advantages of the present invention, and a better understanding of its operation will be had from the following detailed description, taken in conjunction with the accompanying drawings, in which:

FIG. 3 is an exploded perspective view of the rotor of the instrument of FIG. 12;

Figure 1:
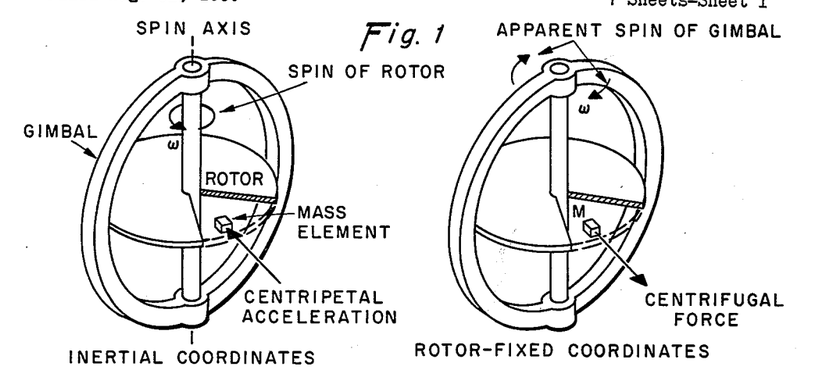
FIGS. 1 and 2 are diagrammatic representations of a spinning rotor, useful in explaining the principles of centrifugal force and Coriolis force, respectively.
Figure 2:
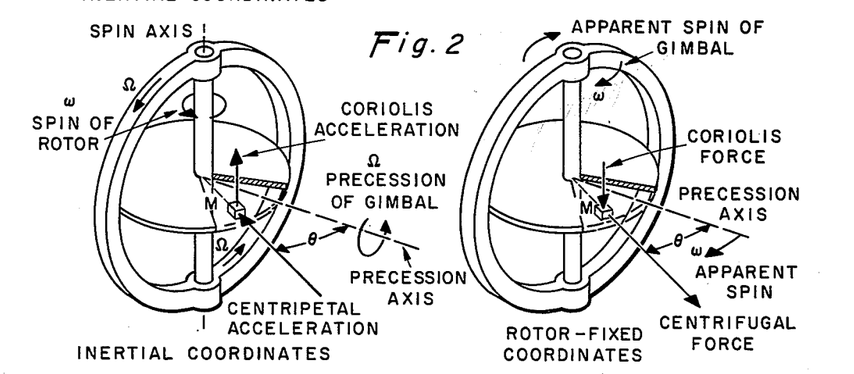

For an explanation of the principle of operation of the invention, reference is made to FIGS. 1 and 2 which will be useful in comparing centrifugal force and Coriolis force. In both figures, the illustration at the left shows a spinning rotor in terms of inertial coordinates, and the views on the right depict the rotor in terms of rotor-fixed coordinates. Referring now to the lefthand illustration in FIG. 1, there is shown a rotor spinning about a spin axis within a gimbal frame, part of the rotor being cut away to reveal a small segment of the rotor, which for purposes of the following discussion will be termed a "mass element." The dimensions of this element are assumed to be negligible in comparison with those of the rotor. The spinning of the mass element about the spin axis produces the well-known centripetal acceleration, which, as shown in the diagram, acts along the radius from the mass element to the spin axis and is directed toward the spin axis. The centripetal acceleration, designated $A_{cen}$, is equal to $$A_{cen} = \omega^2 R$$

where $\omega$ is the angular rate of spin of the rotor and R is the radial distance of the mass element from the spin axis.

If an observer were spinning along with the rotor, he would observe the rotor and gimbal as illustrated in the righthand sketch of FIG. 1. The rotor would appear to be fixed, and the gimbal would appear to spin with the angular rate $\omega$ as shown. The mass element is fixed with respect to the rotor and consequently would not appear to accelerate. Instead, it would appear that there was a force on the mass element pulling it away from the axis of rotation. This force is the well known centrifugal force, experienced every time one takes a sharp curve in an automobile. The centrifugal force, herein designated $F_{cen}$, is equal to the centripetal acceleration multiplied by the mass M of the mass element. As is well known $$F_{cen} = M\omega^2 R$$

and as illustrated in FIG. 1, the centripetal acceleration and centrifugal force act in opposite directions.

In the consideration of FIG. 1, the gimbal frame was assumed to be fixed with respect with inertial space. Assume now that the gimbal frame is rotated about an axis perpendicular to the spin axis of the rotor as shown in FIG. 2. This rotation of the gimbal frame will be termed "precession" to distinguish it from the rotation of the rotor with respect to its gimbal, which will be designated "spin." The angular rate of precession with respect to inertial space will be designated $\Omega$, and it will be assumed that $\Omega$ will be much smaller than the spin rate $\omega$. It is the precession rate $\Omega$ which is to be measured by the instrument of the invention.

The lefthand figure of FIG. 2 shows that when the gimbal is precessed the mass element of the rotor receives in addition to the centripetal acceleration a component of acceleration parallel to the spin axis, which is called Coriolis acceleration. The Coriolis acceleration of the mass element, designated $A_{cor}$, is equal to $$A_{cor} = 2\omega\Omega R \cos \theta$$

where $\theta$ is shown in FIG. 2 and represents the angle between the axis of precession and the radius of the mass element from its center of rotation. (The axis of precession is considered to intersect the axis of spin and to be in the plane of rotation of the mass element.)

Since $\Omega$ is much less than $\omega$, the Coriolis acceleration, which is proportional to $(\Omega\omega)$, is much smaller than the centripetal acceleration which is proportional to $\omega^2$. In addition to the Coriolis and centripetal accelerations shown in the left illustration of FIG. 2, there is also a very small centripetal acceleration proportional to $\Omega^2$. However, this latter centripetal acceleration is, for practical purposes, negligible in this application and will be ignored.

To an observer rotating with the wheel, when the gimbal is precessed, the rotor and gimbal appear as shown in the lefthand illustration of FIG. 2. The gimbal and the precession axis appear to spin with respect to the rotor at the spin rate $\omega$. The mass element appears to have two inertial forces acting upon it, the centrifugal force and a Coriolis force. The Coriolis force acts parallel to the spin axis and in the opposite direction to the Coriolis acceleration, as indicated. The Coriolis force in this situation is $$F_{cor} = 2M\Omega\omega R \cos \theta$$

Since the mass element M of the rotor spins with respect to the precession axis, the angle $\theta$ increases linearly with time. Therefore the Coriolis force varies sinusoidally at the spin frequency $\omega$. The equation for the Coriolis force can be expressed as $$F_{cor} = 2M\Omega\omega R \cos (\omega t + \phi)$$

where $t$ is time in seconds and $\phi$ is the angle between the precession axis and the radius of the mass element at time $t = 0$.

In the immediately preceding discussion, the precession axis was assumed to be perpendicular to the spin axis. To correct for this assumption the precession rate $\Omega$ indicated in the formulae should be taken as that component of precession rate perpendicular to the spin axis. The component of gimbal precession rate parallel to the spin axis merely has the effect of slightly changing the spin rate, and consequently has negligible effect in this application.

From the foregoing it is seen that the Coriolis force acting on the mass element varies sinusoidally at the frequency of spin. Its amplitude is proportional to the magnitude of the precession-rate component perpendicular to the spin axis, and it has a phase angle which defines the angle of that precession-rate component in space. Since the Coriolis force is an oscillating force it can be detected with a high degree of accuracy to provide a very accurate measure of angular rate of rotation of the gimbal frame with respect to inertial space.

As has been shown, the Coriolis force appears as a force only to an observer rotating along with the rotor. Therefore the force must be detected by a device mounted on and moving with the spinning rotor. This feature is very significant and is the major difference between the present instrument and the gyroscope.

In the preceding discussion, the dimensions of the mass element were assumed to be small in comparison to those of the rotor. However, in a practical instrument it is desirable to use a mass element with dimensions which are large relative to those of the rotor in order to achieve a strong signal. The Coriolis force acting on a large mass element is equal to the integral, or sum, of the Coriolis forces acting upon the infinitesimal portions of that mass element. The Coriolis force is still sinusoidal for the large element, it oscillates at the spin frequency, and has an amplitude proportional to the component of precession rate perpendicular to the spin axis, and has a phase angle which defines the direction of that precession rate component.

In measuring the Coriolis force exerted on a mass element of the rotor it is very desirable that there be no static-friction nor hysteresis forces which could obscure the Coriolis force. This condition is achieved by using a fluid as the mass element, and measuring the Coriolis force exerted upon the fluid. Two basic techniques for measuring the force are: (1) the fluid is constrained in a chamber and the oscillating pressures generated within that fluid are measured; and (2) the fluid is allowed to move relative to the rotor and the oscillating motion of that fluid is measured.

Figure 3:
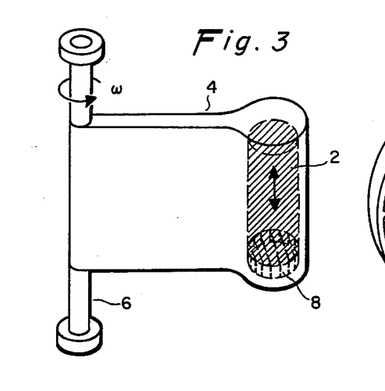
FIGS. 3 and 3A are diagrammatic illustrations of two forms of pressure-sensitive Coriolis inertial sensors in accordance with the invention.

FIG. 3 somewhat diagrammatically illustrates a simple configuration of an inertial Coriolis sensor in which the fluid is constrained and the pressure is measured.

The sensor employs a column of mercury 2 carried on a vane 4, which in turn is supported on a shaft 6. The oscillating Coriolis force generated in the mercury as the vane is spun about the axis of the shaft 6 is applied to a transducer 8, shown positioned at the botttom of the column of mercury. The transducer generates an oscillating voltage proportional to the oscillating Coriolis force.

Figure 3A:
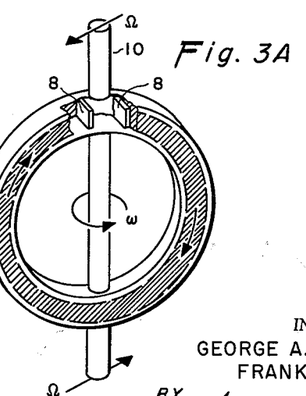

A difficulty with the configuration of FIG. 3 is that the transducer is subjected to a very high centrifugal pressure which may reduce its effectiveness as a detector of the oscillating Coriolis force. To eliminate this difficulty, the mercury column may be arranged in a loop configuration as shown in FIG. 3A, with a pair of transducers 8 placed close to the axis of spin where the centrifugal pressures are smaller. The mercury is confined in a closed hollow loop which is supported for rotation about axis 10.

As shown in FIG. 3A, at any instant of time the Coriolis forces in opposite sides of the loop are in opposite directions. That is, at the instant shown in the drawing, a greater force is being exerted on the left-hand transducer than on the right-hand transducer. More will be said later about the relative phase of these two oscillatory pressures, and suffice it to say at this juncture that the signals from the crystals are properly added, amplified, and filtered to provide a maximum signal at the frequency correspoding to the spin frequency.

Figure 4:
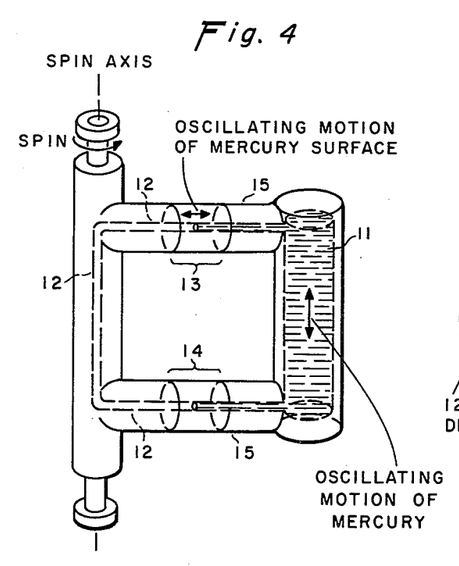
FIG. 4 is a perspective view of one form of displacement-sensitive Coriolis inertial sensor.

Referring now to FIG. 4, there is shown an embodiment of the invention in which the fluid is allowed to move with respect to the rotor, and the oscillating motion is detected to provide the measure of angular rate of rotation of the spin axis. In this embodiment, a large column of mercury 11 acts as the mass element, the two ends of the mercury column being connected by a narrow tube 12. The mercury fills the outer portions of the tube 12 up to the centers of a pair of transducers, indicated at 13 and 14. Oscillating Coriolis forces acting on the mercury column cause an oscillating motion of that column, and an oscillating motion of the surfaces of the mercury in the tube 12. The oscillating motion of the mercury surfaces are measured by transducers 13 and 14, to provide a measure of the angular rate of rotation of the spin axis.

Figure 4A:
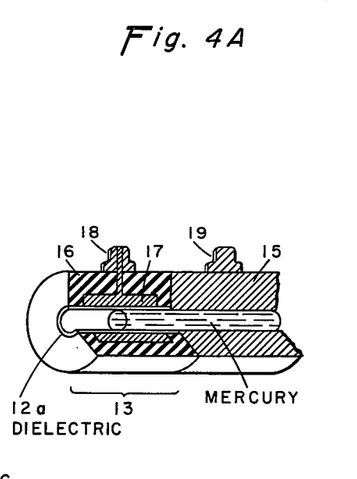
FIG. 4A is a fragmentary cross-sectional view of FIG. 4 illustrating a displacement-sensitive transducer.

A suitable transducer for measuring the motion of the surface of the mercury in the tube 12 of FIG. 4 is shown in FIG. 4A. The container for the column of mercury 11 is supported on the shaft by arms 15, preferably formed of metal, with the tubular opening 12 formed therein. The transducer includes a section of insulating material 16 inserted in the arm 15, in which is imbedded a metal ring 17. Internally of the ring 17 and providing the tubular opening for the mercury within the transducer is a section of thin-walled dielectric tubing 12a. Electrical connection may be made to ring 17 and to arm 15 at terminals 18 and 19, respectively. It will be observed that the mercury in the tube 12 is in electrical contact with the metal section 15, which, in turn, is in contact with terminal 19. Thus, the capacitance between terminals 18 and 19 is the capacitance across dielectric tube 12a between the mercury and the metal ring 17. This capacitance is proportional to the length of the column of mercury lying under the ring, and hence varies with motion of the end surface of the mercury.

The capacitance between contacts 18 and 19 can be measured by conventional techniques by measuring the A.-C. admittance between the contacts by means of an A.-C. signal. Such a measurement will provide a signal proportional to capacitance and hence proportional to the displacement of the mercury surface.

Another means of measuring the motion of the mercury surface is to apply a constant D.-C. voltage between terminals 18 and 19. Variation of capacitance will cause a current to flow between the terminals which is proportional to the rate of change of capacitance. Measurement of this current thus gives a signal proportional to the rate-of-change of displacement, or velocity, of the surface of the mercury.

Thus, the instrument shown in FIGS. 4 and 4A can provide a measure of either the displacement or velocity of the fluid. It is thus apparent that the difference between a measurement of displacement and a measurement of a derivative or integral of displacement of the fluid is not of fundamental significance. What is important is that an oscillating motion of the fluid is detected, where the term "motion" can be considered to represent the displacement or any time derivative or integral thereof.

Figure 5:
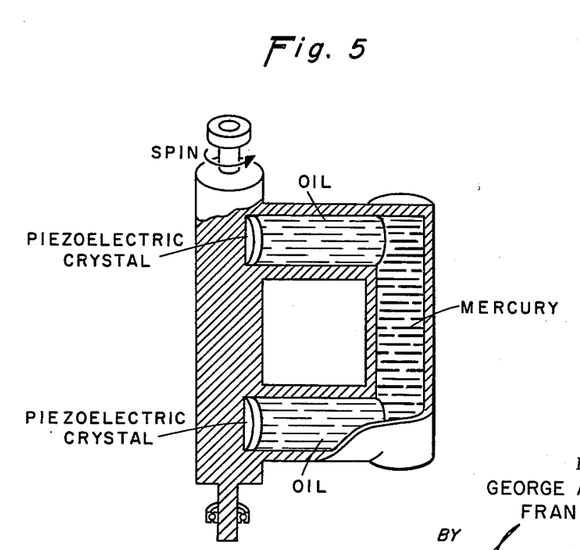
FIG. 5 is a perspective view of another form of pressure-sensitive sensor.

An amplification of the pressures generated within the fluid or the motion of that fluid can be obtained by making the fluid resonate at the frequency of spin. To achieve such resonance with a single fluid is usually very difficult, because it generally requires a prohibitively long fluid loop. Such resonance can be achieved much more conveniently by employing two fluids: a high density fluid which provides most of the mass, and a high-compliance fluid which provides most of the compliance. FIG. 5 shows how resonance can be achieved in a pressure-sensing version of the invention using mercury as the high density fluid and oil as the high compliance fluid. The mercury fills the outer portion of the chamber, and forces the oil into the inner portions because of the higher density of the mercury. By adjusting the dimensions of the chambers, a resonance can be achieved with the fluids to produce a large increase in the oscillating pressure delivered to the crystals.

Figures 6, 6A, 7:
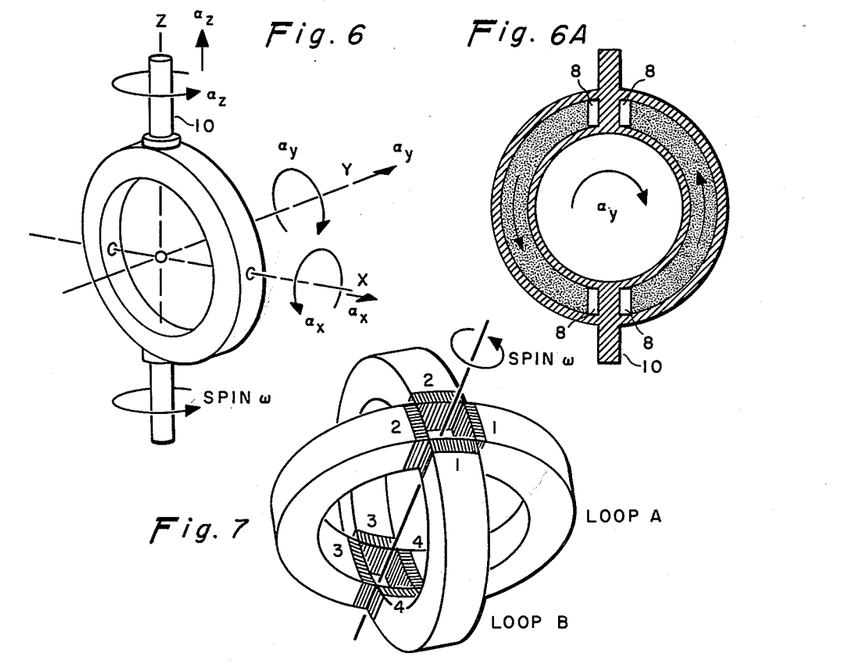
FIGS. 6 and 6A are respectively a perspective view and a cross-sectional view of a sensor similar to that of FIG. 3A but employing four pressure-sensitive transducers instead of two.
FIG. 7 is a perspective view, somewhat diagrammatic, of a two-loop configuration of the inertial sensor according to the invention.

As the rotor of FIG. 3A spins in its bearings, it will tend to vibrate at frequencies which are harmonics of the spin frequency. It is important that such vibration does not produce oscillating pressures in the fluid which could mask out the Coriolis pressure. However, since the instrument is sensitive only to signals at the spin frequency, it is only those vibrations occurring at the spin frequency with respect to the rotor that are of serious concern. Much of the effect of vibration can be eliminated by employing the balanced loop configuration of FIGS. 6 and 6A in which four piezoelectric crystals are employed. Examination of FIG. 6 will reveal that linear vibrations about the X, Y or Z axes, or angular vibrations about the X or Z-axis have no effect if the instrument is perfectly balanced. However, angular vibration about the Y-axis at the frequency of spin can produce significant errors. This vibration is represented in FIGS. 6 and 6A by the vector $\alpha_Y$, which is the angular acceleration of the rotor about its Y-axis occurring at the frequency of spin. As shown, the Y-axis is perpendicular to the plane of the center line of the mercury loop.

Such errors as may be due to vibration of the fluid loop about the Y-axis can be eliminated by employing two fluid loops in space quadrature, as diagrammatically shown in FIG. 7. The shaded areas in this figure indicate the positions of eight transducers, such as piezoelectric crystals, four in each of the two loops, respectively designated loop A and loop B. It will be understood that the two loops are generally of the form illustrated in the cross-sectional view of FIG. 6A. Deferring until later a detailed description of the manner in which the signals from the eight transducers are combined, suffice it to say that a mixing circuit is employed to provide a 90-degree phase shift between the signals from the crystals of loop A and loop B, prior to addition of the signals. With this treatment of the signal, and the loops and crystals being otherwise perfectly balanced, all errors due to vibration of the rotor in its bearings is completely eliminated.

Figure 8:
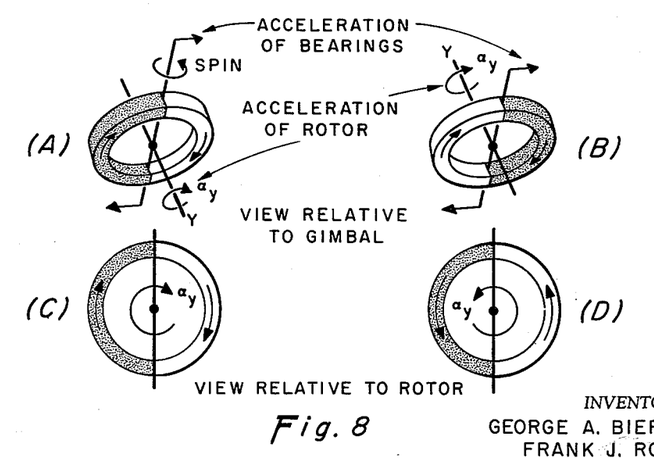
FIGS. 8, 9 and 10 are a series of diagrams, useful in explaining how errors due to vibration are eliminated by the configuration of FIG. 7.

This conclusion is based upon the requirement that the fluid loop cannot vibrate about its Y-axis at the spin rate, without also vibrating about its X-axis at the same amplitude but in time quadrature. For an explanation of this, reference is made to FIG. 8 in which sketches A and B illustrate two positions of a single loop element of the construction shown in FIG. 6, the shaded areas being employed to show that the position in sketch B occurs one-half cycle of the spin frequency later than the position of sketch A. Sketches C and D, showing the vibrations relative to the rotor, occur at the same times as those represented by sketches A and B, respectively. For purposes of this discussion, assume first that the rotor vibrates only about the Y-axis at the pin frequency. Diagrams A and B show the angular acceleration $\alpha_Y$ applied to the rotor and the corresponding acceleration that must occur at the bearings. It will be observed that the acceleration of the bearings with respect to the gimbal frame is in the same direction in diagrams A and B in spite of the fact that the angular acceleration with respect to the rotor has reversed (diagrams C and D). In other words, there must be a unidirectional component of acceleration of the bearings. However, such a unidirectional component cannot exist, because the gimbal frame holding the bearings is not accelerating. Therefore, the assumption that was made that the rotor is vibrating at the spin frequency only about its Y-axis cannot hold when the gimbal frame is not accelerating.

Figure 9:
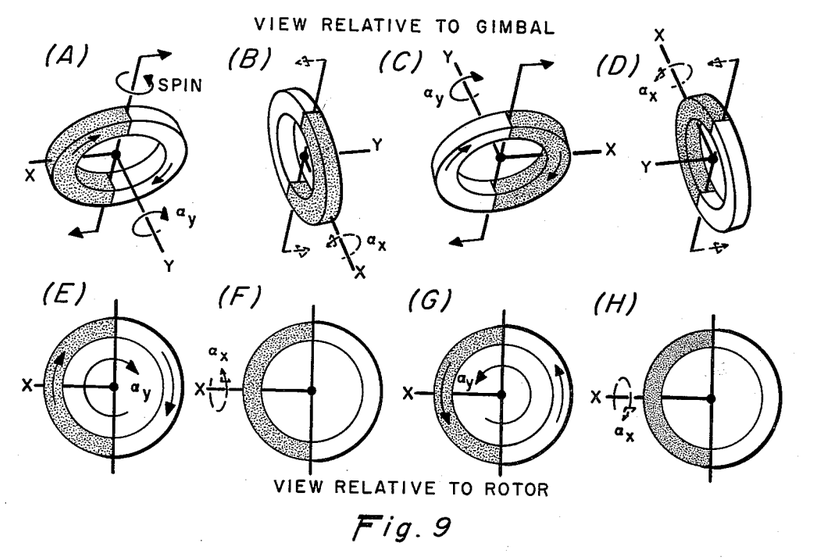

FIG. 9 illustrates the rotor in four different positions, at successive quarter cycles of the spin frequency, and illustrates how the rotor actually vibrates. As in FIG. 8, one-half of the loop is shaded to enable the reader to better visualize the positions of the rotating loop. If the loop vibrates about its Y-axis, it must also vibrate at an equal amplitude about its X-axis, and the vibration about the X-axis must be 90 degrees out of phase with that about the Y-axis. The accelerations due to the vibrations about the X-axis are shown by dashed arrows, and the accelerations due to vibrations about the Y-axis are shown by solid arrows.

As shown in FIG. 9, the acceleration of the bearings due to $\alpha_X$ (diagram B) is in the opposite direction to the acclereation due to $\alpha_Y$ shown in diagram A. Thus, the average acceleration to the bearings over a half cycle of the spin frequency is zero and the gimbal therefore need not accelerate. The combined spin-frequency vibrations about the X- and Y-axes of the rotor produce vibrations at the bearings with respect to the gimbal at the second harmonic of the spin frequency.

Since the rotor must vibrate about the X-axis at the same amplitude as it vibrates about the Y-axis, for a spin-frequency vibration, it is possible to compensate for the effects of rotor vibration about the Y-axis by also measuring the vibration about the X-axis. This compensation can be achieved by employing the double loop configuration of FIG. 7, as will be shown in a consideration of FIG. 10, which illustrates views of the rotor with respect to the gimbal every quarter cycle of the spin frequency. As shown, the gimbal is assumed to have a precession rate $\Omega$ perpendicular to the axis of spin. At the time depicted by diagram A, the precession axis is assumed to be parallel to the X-axis of the rotor. The precession rate $\Omega$ generates Coriolis accelerations in the fluid as illustrated by the straight arrows. These arrows are indicated as straight and parallel to the spin axis, because the Coriolis force is directed parallel to the spin axis. The vibration accelerations of the rotor, $\alpha_Y$ and $\alpha_X$, about the Y and X axes of the rotor, generate accelerations in the fluid indicated by the curved arrows. These arrows are shown as curved because the force of the fluid caused by these accelerations are directed tangentially to the fluid loop. As in previous illustrations, one-half of one of the loops is shaded to better visualize the relative position of the loops in successive diagrams.

Figure 10:
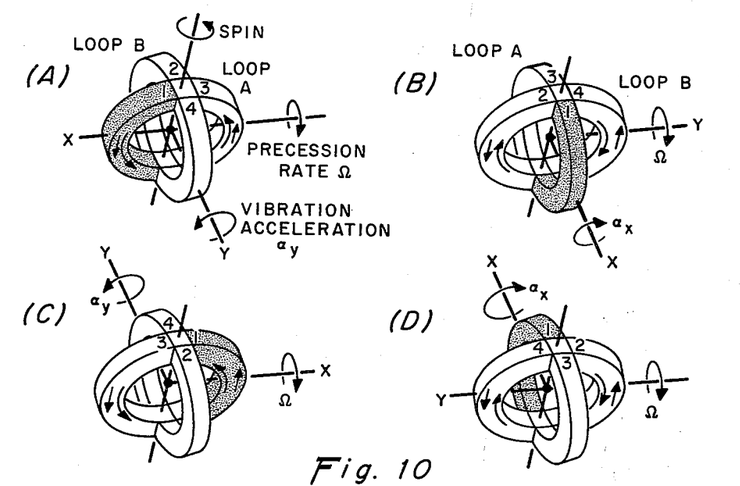

When the double-loop configuration is in the position shown in diagram A, the Coriolis and vibration accelerations, designated by straight and curved arrows, respectively, are impressed upon loop A, and are in the same direction. In contrast, in the position shown in diagram B, one-quarter cycle later, these accelerations are impressed upon loop B and are in opposite directions. Consequently, it is possible to separate the Coriolis and vibration signal-components by comparing the signal from loop A with that from loop B occurring one-quarter cycle later. To make this comparison, the electrical signals from the transducers in loop A are delayed in phase by 90 degrees relative to that for loop B and added to the signals from loop B. In the resultant signal, the Coriolis components add and the vibration components cancel. It will be observed that the Coriolis and vibration accelerations in diagrams C and D, at one-half and three-quarter cycles, correspond to the accelerations shown in diagrams A and B. Thus, if the double-loop rotor is perfectly balanced mechanically and electrically, the resultant output signal is completely unaffected by vibration of the rotor in its bearings. As a result, this configuration is capable of measuring with a very high degree of accuracy angular rate of rotation of the gimbal frame with respect to inertial space.

Although a two-loop configuration has been described and analyzed to point up the capability of rejection of vibration effects, it is to be understood that other similar configurations employing more than two loops are also effective. The important consideration is that the structure must employ more than one accurately balanced fluid-filled compartment, oriented in such a manner that the compartments sense vibration accelerations about both the X and Y axes, with the signals from these compartments fed through an accurately matched phase-shift and mixing network which compensates for the phase difference between the Coriolis signals of the various compartments. For example, the instrument could employ three identical loops oriented at angles of 60 degrees with respect to one another, with the signals from the transducers of two of the loops given 60-degree leading and lagging phase shifts, respectively, and added to the signal of the third loop. In the resultant signal, the Coriolis components would add and the vibration components would be canceled.

The principle of the double loop configuration has been specifically described in terms of a model using pressure sensitive transducers. Nevertheless, the principle applies equally well to versions of the invention using motion-sensitive transducers.

Figure 11:
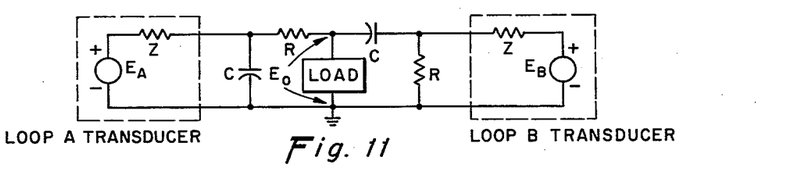
FIGS. 11 and 11A are schematic diagrams of circuits for sensing and measuring the oscillating Coriolis signals in the two-loop configuration of FIG. 7.

To achieve accurate cancellation of vibration components, it is desirable that the phase shifting and mixing of the signals from the transducers of the double-loop configuration be performed by circuitry mounted on the rotor, which circuitry should be simple and capable of high accuracy and high stability. These conditions are satisfied by the circuitry illustrated in FIGS. 11 and 11A, which represent single-ended and balanced versions, respectively, of a mixing circuit for performing the required 90-degree relative phase shift and mixing of the signals from the transducers of the two loops of the double-loop configuration of FIG. 7. The transducers of loops A and B are represented by their equivalent circuits consisting of potential sources $E_A$ and $E_B$ and series impedances Z. It is understood that each of the equivalent circuits may represent either the circuit of a single transducer or the combined circuit formed by interconnecting a number of transducers of a given loop. For proper operation of the circuits, the sensitivities and impedances of the resultant equivalent circuits of the transducers of the two loops should be accurately matched. The transducer of loop A is shunted by a capacitor of capacitance C, the transducer of loop B is shunted by a resistor of resistance R, and between the loop A transducer and loop B transducer is a series impedance of resistance R and capacitance C. The values of resistance R and capacitance C are chosen such that the product RC is equal to the reciprocal of the angular spin frequency $\omega$ in radians per second. The voltage at the junction of the resistor R and capacitor C of the series impedance is taken as the output signal of the circuit and designated as $E_0$ in the figures. In the single-ended version shown in FIG. 11, the series impedance is implemented by a series combination of a resistor of resistance R and a capacitor of capacitance C between corresponding terminals of the loop A and loop B transducers, with the other terminals of the loop A and loop B transducers shorted together. In the double-ended version shown in FIG. 11A, the series impedance comprises two series combinations of a resistor of resistance $R/2$ and a capacitor of capacitance $2C$ across corresponding terminals of the loop A and loop B transducers.

The output voltage $E_0$ from the mixing circuit is applied to other circuitry which may provide amplification, signal conversion, signal transmission, etc. The input impedance of such other circuitry is represented by a Load in FIGS. 11 and 11A, across which the output voltage $E_0$ is applied. In the single-ended version of FIG. 11, the load is connected from the junction of the series resistor and capacitor to the shorted connection of the other terminals of the loop A and loop B transducers, and in the double-ended version of FIG. 11A, such other circuitry is connected across corresponding resistor-capacitor junctions of the two series impedances. The described mixing circuit produces at the output $E_0$ exactly 90-degrees relative phase shift between the signals from the transducers of loop A and loop B with an equal change of amplitude, regardless of the input load impedance of the subsequent circuitry or the transducer impedances, provided the transducer impedances of the two loops are the same. It is very essential that the balance of the mixing network be independent of the input impedance of the Load because of the difficulty of accurately controlling the input impedance of amplifiers, signal converters, etc.

To achieve very high accuracy, amplification of the electrical signals from the transducers is performed directly on the rotor, because considerable noise is introduced when the signals are coupled off the rotor through slip rings or other similar devices. Because of the high centripetal accelerations experienced on the rotor, amplification desirably is performed by semiconductor devices rather than by electronic tubes. A description of circuitry for performing such amplification will follow in a discussion of a specific embodiment of the invention.

Figure 12:
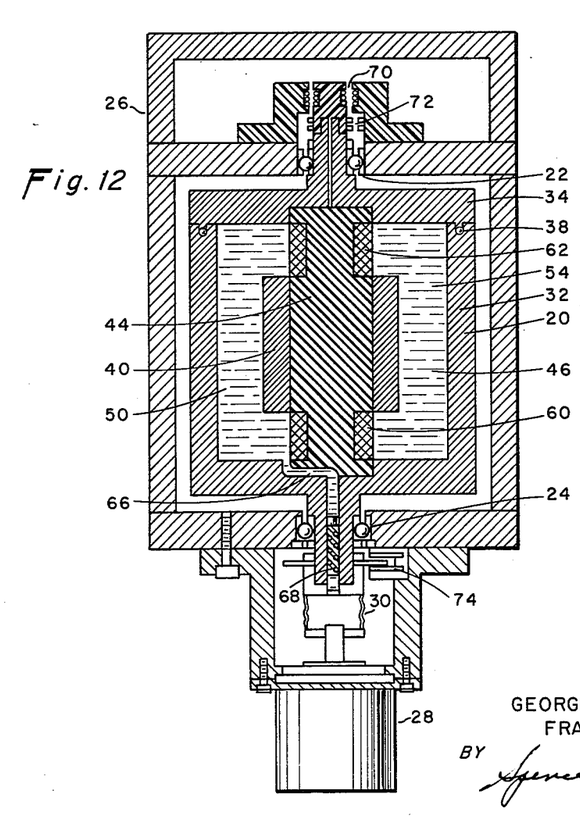
FIG. 12 is an elevation cross-sectional view of a preferred form of instrument in accordance with the invention.
Figure 13:
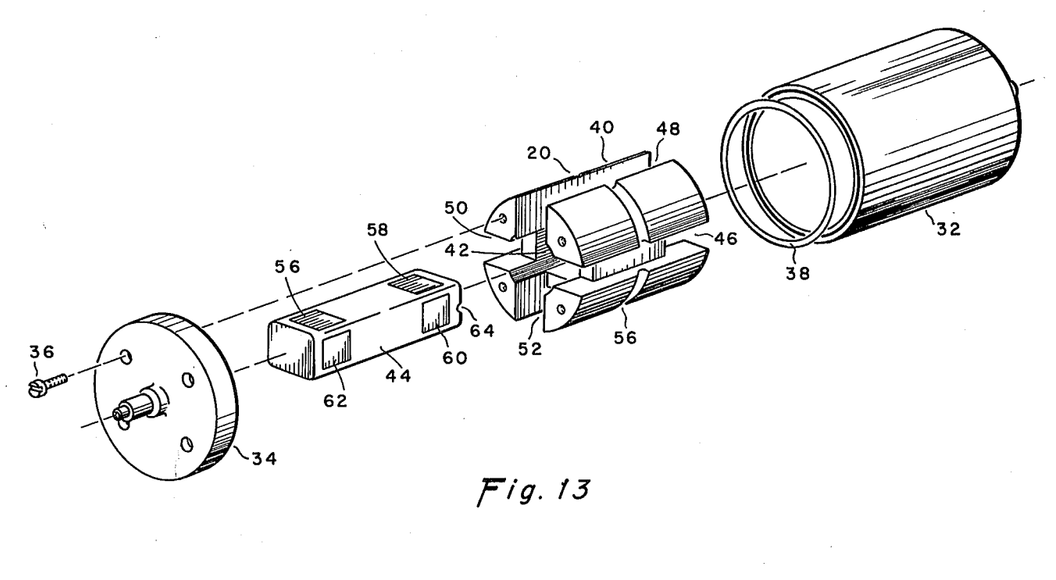

Referring to FIGS. 12 and 13, a preferred form of double-loop configuration will now be described. The device includes a cylindrical rotor 20 (to be described in greater detail in connection with FIG. 13) journaled in bearings 22 and 24 carried on a gimbal frame 26. The rotor is driven at a constant speed by a synchronous motor 28 which is coupled to the rotor by a flexible coupling 30. By way of example, the rotor may be driven at a speed of 200 revolutions per second.

As best seen in the exploded view of FIG. 13, the rotor includes a shell 32 and an end cap 34 which are secured together by bolts, one of which is shown at 36. An O-ring 38, preferably formed of stainless steel, is placed between the end cap and the end of the shell to provide a tight seal. Closely fitting within the shell 32 is a generally cylindrical core 40 having a rectangular opening along the central axis 42 for receiving a rectangular package or insert 44 containing eight transducers and associated circuitry to be described later. Four deep axial slots 46, 48, 50 and 52, spaced 90-degrees apart, are formed in the cylindrical surface of the core, these slots being filled with mercury, indicated at 54 in FIG. 12, to provide four fluid-filled chambers. A peripheral groove 56 interconnects these compartments to allow free flow of mercury from one compartment to the other so as to equalize the static pressures in the four chambers. Radial slots are formed in the ends of the core 40 in register with the longitudinal slots 46, 48, 50 and 52 to form, when the insert 44 is in place, four "half-loops" of rectangular cross-section.

The electronics insert 44, a unitary assembly preferably encased in a suitable potting compound, carries two transducers on each of its lateral surfaces, four of them, designated 56, 58, 60 and 62, being shown in FIG. 13. When the insert 44 is assembled with the core 40, the transducers effectively provide end closures for the four "half-loops" such that the opposite ends of each of the four half-loops of mercury are in contact with a transducer. Also contained in the electronics insert 44 and connected to the transducers are suitable mixing circuits and a preamplifier circuit for amplifying the signals derived from the crystals to a suitable level for coupling from the rotor.

With the rotor completely assembled and sealed, mercury is introduced by evacuating the shell and feeding the mercury into the rotor through an inlet port 66 which passes through the shaft of the rotor shell 32, and thence through a slot 64 formed in the end of the electronics insert 44. The inlet port is closed by a piston and spring 68 mounted centrally of the rotor shaft to allow for expansion of the mercury with changes in temperature.

The cross-sectional view of FIG. 12 is taken along that diameter of the rotor to show the chambers formed in part by slots 46 and 50. Transducers 60 and 62 are at opposite ends of chamber 46, and another pair of transducers are correspondingly positioned at the ends of chamber 50. It will be appreciated that two other similar chambers, with two transducers in each, are positioned in space quadrature with the chambers illustrated. When the gimbal frame 26 is rotated with respect to inertial space, in such a direction as to change the direction of the spin axis of rotor 20, oscillating Coriolis forces are developed within the mercury columns defined by the four compartments. These oscillating Coriolis forces develop oscillating pressures in the mercury which are sensed by the transducers positioned at the ends of the mercury columns, the transducers delivering oscillating electrical signals proportional to the pressures developed. These signals are mixed and amplified by circuitry contained in the electronics insert 44, the details of which will be described hereinafter, and are coupled from the rotor by an induction signal pick-off device 70, which may include a primary winding carried on the rotor and insulated therefrom, and a secondary winding carried on the gimbal frame.

Power for the amplifier carried within the electronics insert 44 is coupled to the rotor by slip rings 72, and an oscillating signal for indicating the instantaneous relative angular position between the rotor 20 and the gimbal frame 26 is capacitively coupled from the rotor by a suitable pick-off device indicated at 74. The significance of this reference signal will be discussed hereinbelow.

Since the piezoelectric crystal transducers have a very high impedance, in order to achieve high accuracy, the amplifier carried on the rotor must have a very high input impedance and a low noise figure at 200 cycles per second, to provide low-noise amplification of the crystal signals. Semiconductor devices rather than electronic tubes are desirable because of high centripetal acceleration. However, the transistor is not capable of satisfying the requirements of the input stage of the amplifier because of its high noise-figure at 200 c.p.s. and its low input-impedance. Instead, a variable capacitance silicon diode is used as the input amplifying element, to provide a very high input-impedance and very low noise. The 200 cycles-per-second signal from the piezoelectric crystals is applied across the variable capacitance diode, thereby producing a 200 cycles-per-second variation of its capacitance. In an amplifier circuit to be described, this capacitance variation produces a frequency modulation of a 2 megacycles-per-second carrier signal, but could also be used to produce amplitude or phase modulation of a signal at the same frequency. The resultant modulated signal is at sufficiently high frequency and low impedance for further low-noise amplification by transistors.

Figure 14:
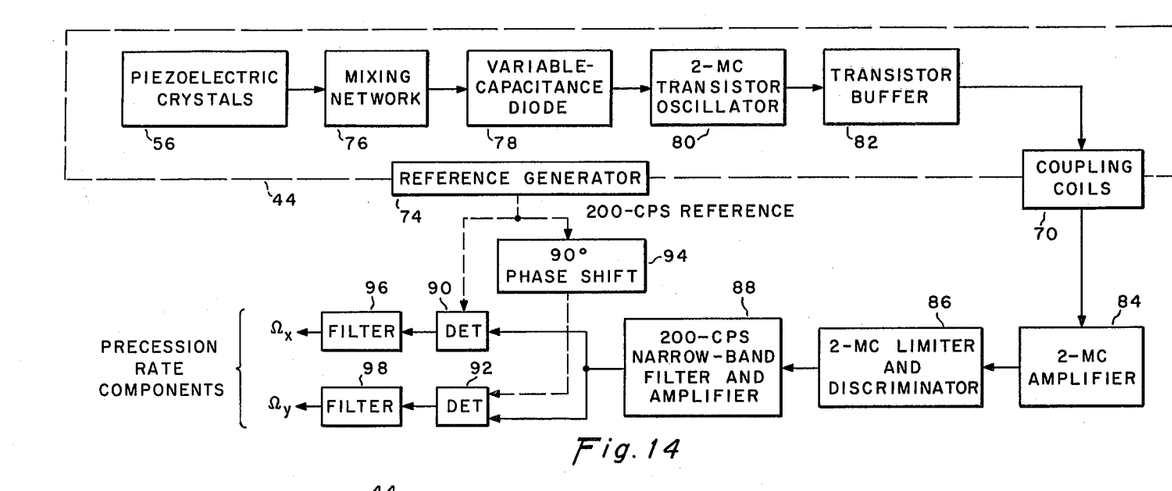
FIG. 14 is a block diagram of electronic circuitry for the instrument of FIG. 12.

FIG. 14 is a block diagram of suitable electronic circuitry for detecting and measuring the oscillating Coriolis forces developed within the rotor, the portion contained in the dotted rectangle 44 being contained within the electronic insert previously described. The partial enclosure of the reference generator 74 and coupling coils 70 indicates that a portion of these elements are mounted on the gimbal frame. For consideration of the block diagram all of the eight crystals are represented by the single block 56, the outputs of which are combined together by a mixing network 76, the resultant combined signal being applied across a variable capacitance diode 78. Since the spin frequency is 200 cycles per second, in this illustrative embodiment, oscillating Coriolis pressures in the mercury cause the crystals to deliver 200 cycles per second signals proportional to these pressures, whereby the capacitance of diode 78 is varied at a 200 cycles per second rate. The variable capacitance diode 78 forms a part of the resonant circuit of a two megacycle transistor oscillator 80 whereby the variation of the capacitance of diode 78 produces a 200 cycles-per-second frequency modulation of the two megacycle signals. This frequency modulated signal is amplified by a transistor buffer stage 82 and is then coupled from the rotor through coupling coils 70.

The signal from coupling coils 70 is amplified in a two megacycle amplifier 84 and applied to a two megacycle limiter and discriminator 86. The output from the discriminator, in this illustrative example, is a 200 cycles-per-second signal corresponding to the signal originally impressed on variable capacitance diode 78. This 200 cycles-per-second signal is filtered and further amplified in circuit 88 and applied in parallel to two phase-sensitive detectors 90 and 92. The reference generator 74 on the rotor delivers a 200 cycles-per-second reference signal, the instantaneous value of which is proportional to the sine of the angle between the X-reference axis on the rotor and a corresponding axis of the gimbal frame herein designated as X'. The gimbal-frame axis perpendicular to X' and the spin axis is designated as Y'. The reference signal is applied directly to detector 90, and is phase shifted by 90-degrees by a phase-shifting network 94 prior to application to phase-sensitive detector 92. The outputs from these phase-sensitive detectors 90 and 92 are filtered in low-pass filters 96 and 98, respectively, the outputs being bipolar direct voltages proportional to the inertial-space angular rate components $\Omega_X$ and $\Omega_Y$ of the gimbal frame, about the X' and Y' gimbal axes. The X' and Y' gimbal-frame axes are perpendicular to one another and lie in a plane perpendicular to the spin axis of the rotor.

Figure 15:
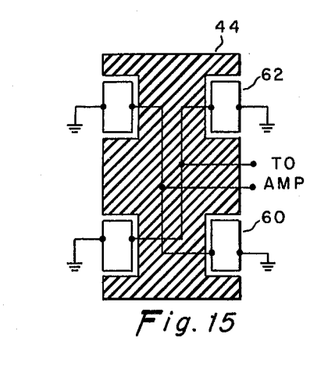
FIG. 15 is a circuit diagram illustrating the interconnection of transducers in the instrument of FIG. 12.

Having described the overall operation of the electronic circuitry associated with the instrument, reference is now made to FIG. 15 for consideration of suitable specific circuitry carried on the rotor. The outer surfaces of the crystals are preferably grounded, to eliminate the effects of capacitive coupling with the mercury, the crystals being connected together as shown for application to the mixing network. It will be understood that FIG. 15 represents the interconnection of the crystals in one loop only, for example the crystals 62 and 60 on one lateral surface of insert 44 (FIG. 13) and the correspondingly positioned crystals on the opposite lateral surface of the insert. The crystals of the other loop, in space quadrature with the one illustrated, are similarly connected. The output signals from the crystals of the two loops are mixed in a circuit of the type previously described in connection with FIG. 11A and applied to a preamplifier (designated as the Load in FIG. 11A).

Figure 11A:
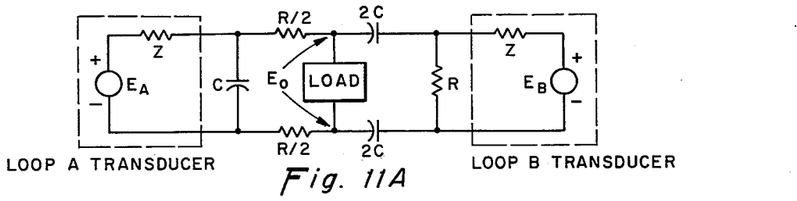
Figure 16:
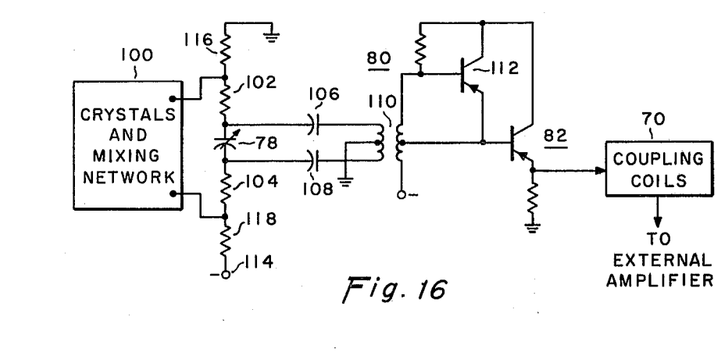
FIG. 16 is a schematic circuit, partly in block diagram form, of the electronic circuitry carried on the rotor of the instrument of FIG. 12.

Referring now to FIG. 16, the crystal interconnections of FIG. 15 and the mixing circuit of FIG. 11A are shown in block diagram form and designated 100, the balance of the circuit being a preamplifier of the class referred to in the discussion of FIG. 12. The signals from the mixing network are coupled through resistors 102 and 104 to a variable capacitance diode 78, and cause the capacitance of diode 78 to vary at a 200 cycles-per-second rate. The diode 78, together with coupling capacitors 106 and 108, and transformer 110 form a resonant feedback circuit around transistor 112, the parameters being selected to cause oscillations at 2 megacycles per second. The 200 cycles-per-second variation of the capacitance of diode 78 produces a 200 cycles-per-second frequency modulation of the two megacycle signal. The modulated signal is amplified by the emitter follower 82 and coupled from the rotor through coupling coils 70. The variable-capacitance diode 78 is back-biased by a bias voltage represented by terminal 114 coupled to the diode through isolation resistors 116 and 118. Resistors 102 and 104 isolate the crystals and mixing network from the resonant circuit of the two megacycle oscillator.

Reference has been made to a capacitive transducer for measuring displacement, and to piezoelectric crystals for detecting pressure effects, but in an instrument embodying the disclosed principle of operation, any one of a variety of available kinds of transducer may be used; e.g. variable reluctance, electromagnetic, magnetostrictive, electrostrictive, strain gauge, etc., depending on whether it is desired to detect the oscillating components of pressure, velocity, or displacement in the fluid compartments. Also, in some situations it may be desirable to use another fluid, between the mercury and the transducer, to transmit pressure variations in or displacement of the mercury to the transducer; for example, it may be desirable to insulate the crystals in the pressure-sensing embodiment from the mercury.

Although an external drive motor for the rotor has been illustrated in FIG. 12, it is to be understood that a more compact instrument can be achieved by making the rotor itself act as a motor armature. Rotation of the rotor at a 200 cycle per second rate has been suggested, but it will be understood that this is illustrative only, and that in some applications a different speed of rotation may be more suitable. Similarly, the oscillator of the preamplifier need not be two megacycles, but might be some other suitable frequency sufficiently higher than the modulating signal. Indeed, other forms of preamplifier circuits capable of handling the signals from the transducers may be used without departing from the spirit of the invention. Likewise, ones skilled in the art may suggest variations in the mechanical construction of the rotor without departing from the two-loop concept which has been specifically described.

With minor construction modifications, motion-sensitive transducers of the type illustrated in FIGS. 4 and 4A can be used in lieu of the pressure sensitive transducers in the embodiment of FIG. 12. The double loop configuration, with the 90-degree relative phase shift and mixing of the signals from the motion-sensitive transducers of the two loops, will provide accurate cancellation of the effects of vibration.

Thus, although the invention has been described as incorporated in a number of specific embodiments, those skilled in the art may now make numerous modifications of and departures from these specific embodiments without departing from the spirit of the invention. Consequently, the invention is to be construed as limited only by the spirit and scope of the appended claims.

What is claimed is:

1. Apparatus for measuring the angular rate of rotation of a body with respect to inertial space, comprising a rotor supported on said body and driven in rotation at a substantially constant spin frequency about a spin axis having a fixed relationship with respect to said body, said rotor being formed with at least two separate compartments containing fluid, at least one transducer in each of said compartments operative in response to the effect on said fluid of oscillating Coriolis forces at said spin frequency exerted on the individual particles of said fluid in a direction parallel to said spin axis due to rotation of said spin axis with respect to inertial space to derive oscillatory electrical signals at said spin frequency of amplitude and phase functionally related to the angular rate of rotation of said spin axis with respect to inertial space, which signals may include components due to vibration of said rotor, said compartments being oriented to form a symmetric pattern about said spin axis and angularly displaced from one another thereby to cause a difference in phase in the electrical signals generated by the transducers in the respective compartments, and circuit means including phase-shifting means for adding in phase the components of said signals due to rotation of said spin axis and for canceling the components of said signals due to vibration of said rotor at said spin frequency about axes perpendicular to said spin axis.

2. Apparatus in accordance with claim 1 including circuit means carried on said rotor for amplifying said electrical signals.

3. Apparatus in accordance with claim 1 wherein circuit means including a variable capacitance diode is carried on said rotor for amplifying said electrical signals.

4. Apparatus for measuring the angular rate of rotation of a body with respect to inertial space, comprising a rotor supported on said body and driven in rotation at a substantially constant spin frequency about a spin axis having a fixed relationship with respect to said body, said rotor being formed with at least two separate compartments containing a fluid arranged to move relative to said rotor, at least one transducer in each of said compartments operative in response to the oscillating motion of said fluid relative to said rotor due to the rotation of said spin axis with respect to inertial space to derive oscillatory electrical signals at said spin frequency having amplitude and phase functionally related to the angular rate of rotation of said spin axis with respect to inertial space, which signals may include components due to vibration of said rotor, said compartments being oriented to form a symmetric pattern about said spin axis and angularly displaced from one another thereby to cause a difference in phase in the electrical signals generated by the transducers in the respective compartments, and circuit means including phase-shifting means for adding in phase the components of said signals due to rotation of said spin axis and for canceling the components of said signals due to vibration of said rotor at said spin frequency about axes perpendicular to said spin axis.

5. Apparatus for measuring the angular rate of rotation of a body with respect to inertial space, comprising a rotor journaled on said body and driven in rotation at a substantially constant spin frequency about a spin axis having a fixed relationship with respect to said body, said rotor being formed with at least two separate compartments filled with fluid, at least one transducer in each of said compartments operative in response to oscillating pressures at said spin frequency generated within said fluid due to rotation of said spin axis with respect to inertial space to derive oscillatory electrical signals at said spin frequency having amplitude and phase functionally related to the angular rate of rotation of said spin axis with respect to inertial space, which signals may include components due to vibration of said rotor, said compartments being oriented to form a symmetric pattern about said spin axis and angularly displaced from one another thereby to cause a difference in phase in the electrical signals generated by the transducers in the respective compartments, and circuit means including phase-shifting means for adding in-phase the components of said signals due to rotation of said spin axis and for canceling the components of said signals due to vibration of said rotor at said spin frequency about axes perpendicular to said spin axis.

6. Apparatus in accordance with claim 1 wherein said compartments are arranged in two groups oriented in space quadrature, said two groups having substantially identical construction, each group being constructed in a symmetric manner about said spin axis and consisting of one or more compartments, and wherein said circuit means includes means to phase shift the electrical signals from the transducers of one of said groups 90 electrical degrees with respect to the electrical signals from the transducers of the other group and to add together the resultant phase-shifted signals from the transducers of said two groups.

7. Apparatus in accordance with claim 6 wherein said circuit means is carried on said rotor and comprises, first and second terminal pairs, one for each of said groups, means connecting the transducers of each group to its respective terminal pair, one of said terminal pairs being shunted by a capacitor of capacitance C and the other terminal pair being shunted by a resistor of resistance R, the product RC being equal to the reciprocal of the angular rate of spin of the rotor, one of the terminals of the terminal pair shunted by the capacitor being connected to the corresponding terminal of the other terminal pair by the series combination of a resistor of resistance R and a capacitor of capacitance C, the other corresponding terminals of said two terminal pairs being directly connected together, and means for deriving an output voltage signal between the junction of said series resistor and capacitor and said directly connected terminals.

8. Apparatus in accordance with claim 6 wherein said circuit means is carried on said rotor and comprises, two terminal pairs, one for each of said groups, means connecting the transducers of each group to its respective terminal pair, one of said terminal pairs being shunted by a capacitor of capacitance C and the other terminal pair being shunted by a resistor of resistance R, the product RC being equal to the reciprocal of the angular rate of spin of the rotor, the terminals of the pair shunted by said capacitor being connected to the corresponding terminals of the other terminal pair by two identical impedances, each of said impedances consisting of a series combination of a resistor of resistance $R/2$ and a capacitor of capacitance 2C, and means for deriving an output voltage signal between the junctions of the resistor and capacitor of said series combinations.

9. Apparatus in accordance with claim 4 wherein said compartments are arranged in two groups oriented in space quadrature, said two groups having substantially identical construction, each group being constructed in a symmetric manner about said spin axis and consisting of one or more compartments, and wherein said circuit means includes means to phase shift the electrical signals from the transducers of one of said groups 90 electrical degrees with respect to the electrical signals from the transducers of the other group and to add together the resultant phase-shifted signals from the transducers of said two groups.

10. Apparatus in accordance with claim 9 wherein said circuit means is carried on said rotor and comprises, two terminal pairs, one for each of said groups, meeans connecting the transducers of each group to its respective terminal pair, one of said terminal pairs being shunted by a capacitor of capacitance C and the other terminal pair being shunted by a resistor of resistance R, the product RC being equal to the reciprocal of the angular rate of spin of the rotor, one of the terminals of the pair shunted by the capacitor being connected to the corresponding terminal of the other terminal pair by the series combination of a resistor of resistance R, a capacitor of capacitance C, in that order, the other corresponding terminals of said two terminal pairs being directly connected together, and means for deriving an output voltage signal between the junction of said series resistor and capacitor and said directly connected terminals.

11. Apparatus in accordance with claim 9 wherein said circuit means is carried on said rotor and comprises, two terminal pairs, one for each of said groups, means connecting the transducers of each group to its respective terminal pair, one of said terminal pairs being shunted by a capacitor of capacitance C and the other being shunted by a resistor of resistance R, the product RC being equal to the reciprocal of the angular rate of spin of the rotor, the terminals of the pair shunted by the capacitor being connected to the corresponding terminals of the other terminal pair by two identical impedances, each of said impedances consisting of a series combination of a resistor of resistance $R/2$ and a capacitor of capacitance $2C$, an output voltage signal being derived between the junctions of the resistor and capacitor of said series combinations.

12. Apparatus in accordance with claim 5 wherein said compartments are arranged in two groups oriented in space quadrature, said two groups having substantially identical construction, each group having constructed in a symmetric manner about said spin axis and consisting of one or more compartments, and wherein said circuit means includes means to phase shift the electrical signals from the transducers of one of said groups 90 electrical degrees with respect to the electrical signals from the transducers of the other group and to add together the resultant phase-shifted signals from the transducers of said two groups.

13. Apparatus in accordance with claim 12 wherein said circuit means is carried on said rotor and comprises, two terminal pairs, one or each of said groups, means connecting the transducers of each group to its respective terminal pairs, one of said terminal pairs being shunted by a capacitor of capacitance C and the other being shunted by a resistor of resistance R, the product RC being equal to the reciprocal of the angular rate of spin of the rotor, one of the terminals of the pair shunted by the capacitor being connected to the corresponding terminal of the other terminal pair by the series combination of a resistor of resistance R and a capacitor of capacitance C, the other corresponding terminals of said two terminal pairs being directly connected together, and means for deriving an output voltage signal between the junction of said series resistor and capacitor and said directly connected terminals.

14. Apparatus in accordance with claim 12 wherein said circuit means is carried on said rotor and comprises, two terminal pairs, one for each of said groups, means connecting the transducers of each group to its respective terminal pair, one of said terminal pairs being shunted by a capacitor of capacitance C and the other terminal pair being shunted by a resistor of resistance R, the product RC being equal to the reciprocal of the angular rate of spin of the rotor, the terminals of the pair shunted by the capacitor being connected to the corresponding terminals of the other terminal pair by two identical impedances, each of said impedances consisting of a series combination of a resistor of resistance $R/2$ and a capacitor of capacitance $2C$, and means for deriving an output voltage signal between the junctions of the resistor and capacitor of said series combinations.

15. Apparatus for measuring the angular rate of rotation of a body with respect to inertial space, comprising a rotor journaled on said body for rotation about a spin axis having a fixed relationship with respect to said body, said rotor including a closed circular cylindrical shell and a core therein defining wtih said shell four elongated compartments disposed parallel to said spin axis and radially displaced therefrom and oriented in space quadrature, said compartments being filled with fluid, means for driving said rotor in rotation at a substantially constant spin frequency, a transducer disposed at each end of each of said compartment operative in response to components of pressure within said fluid due to rotation of said spin axis with respect to inertial space to generate oscillatory electrical signals at said spin frequency of amplitude and phase functionally related to the angular rate of rotation of said spin axis with respect to inertial space, which signals may include components due to vibration of the rotor about axes perpendicular to said spin axis, the orientation of said compartments relative to each other causing a difference in phase of the signals generated by the transducers in the respective compartments, and circuit means disposed within said rotor including phase-shifting means for adding in phase the components of said signals due to rotation of the spin axis relative to inertial space and for canceling the components of said signals due to vibration of said rotor at said spin frequency.

16. Apparatus in accordance with claim 15 wherein said circuit means further includes means for amplifying the signal resulting from said addition, means for coupling the amplified signal from said rotor, and further circuit means for resolving said amplified signal into components respectively indicative of the rate of rotation of said spin axis about mutually perpendicular axes perpendicular to said spin axis.

17. Apparatus for measuring the angular rate of rotation of a body with respect to inertial space comprising, a gimbal frame adapted to be secured in fixed relationship to said body, a rotor journaled on said gimbal frame for rotation about a spin axis having a fixed relationship with respect to said frame, means for driving said rotor in rotation at a substantially constant spin frequency, said rotor comprising a hollow circular cylindrical shell and a core closely fitted therein, said core having a central axial opening and axial slots formed in the outer surface thereof oriented in space quadrature and with said shell defining four compartments disposed parallel to said spin axis, an insert fitted within said central axial opening in said core, said insert carrying transducers near its ends arranged to form end closures for said compartments, said compartments being filled with fluid, said transducers being operative in response to components of pressure within said fluid due to rotation of said spin axis with respect to inertial space to generate oscillatory electrical signals at said spin frequency of phase and amplitude functionally related to the angular rate of rotation of said spin axis with respect to inertial space, circuit means contained within said insert for combining and amplifying the signals from said transducers, and means for coupling the amplified resultant signal from said rotor.

18. Apparatus for measuring the angular rate of rotation of a body with respect to inertial space comprising, a gimbal frame adapted to be secured in fixed relationship to said body, a rotor journaled on said gimbal frame for rotation about a spin axis having a fixed relationship with respect to said frame, means for driving said rotor in rotation at a substantially constant spin frequency, said rotor comprising a hollow circular cylindrical shell and a core closely fitted therein, said core being formed with a central axial opening and having four axial slots formed in the outer surface thereof oriented in space quadrature and with said shell defining four compartments disposed parallel to said spin axis, an insert in said central axial opening carrying transducers arranged to form end closures for said compartments, said compartments being filled with fluid, said transducers being operative in response to components of pressure within said fluid due to rotation of said spin axis with respect to inertial space to generate oscillatory electrical signals at said spin frequency having amplitude and phase functionally related to the angular rate of rotation of said spin axis with respect to inertial space, which signals may include components due to vibration of the rotor about axes perpendicular to said spin axis, the space quadrature orientation of said compartments causing a 90 degree difference in phase of the signals generated by the transducers in the respective compartments, circuit means contained within said insert including phase-shifting means for adding in phase the components of said signals due to rotation of said spin axis with respect to inertial space and for canceling the components of said signals due to vibration of said rotor about axes perpendicular to said spin axis, and means for amplifying the resultant signal and coupling said resultant signal from said rotor.

19. Apparatus in accordance with claim 6 wherein a portion of said circuit means including means for amplifying said electrical signals is carried on said rotor.

20. Apparatus in accordance with claim 6 wherein a portion of said circuit means including a variable capacitance diode for amplifying the electrical signals delivered by said transducers is carried on said rotor.

21. Apparatus in accordance with claim 1 wherein a portion of said circuit means including means for modulating said electrical signals is carried on said rotor.

22. Apparatus in accordance with claim 1 wherein circuit means, including a variable capacitance diode, for modulating said electrical signals generated by said transducers is carried on said rotor.

23. Apparatus in accordance with claim 6 wherein said circuit means further includes means carried on said rotor for modulating the electrical signals from said phase-shifting and adding means.

24. Apparatus in accordance with claim 6 wherein said circuit means includes a variable capacitance diode carried on said rotor and connected in circuit with said phase-shifting and adding means for modulating said electrical signals.

25. Apparatus for measuring the angular rate of rotation of a body with respect to inertial space comprising, a rotor adapted to be supported on said body, means for driving said rotor in rotation at a spin frequency about a spin axis having a fixed relationship with said body, said rotor being formed with at least two separate compartments containing fluid, said compartments being arranged in at least two groups, each group being arranged in a symmetric pattern about said spin axis, said groups being angularly displaced from each other about said spin axis, and at least one transducer in each of said compartments operative in response to the effect on said fluid of oscillating Coriolis forces at said spin frequency to derive oscillatory electrical signals at said spin frequency.

26. Apparatus for measuring the angular rate of rotation of a body with respect to inertial space comprising, a rotor adapted to be supported on said body, means for driving said rotor in rotation at a spin frequency about a spin axis having a fixed relationship with said body, said rotor being formed with at least two separate compartments containing fluid, said compartments being arranged in at least two groups, each group being arranged in a symmetric pattern about said spin axis and consisting of one or more compartments, said groups being angularly displaced from each other about said spin axis, and at least one transducer in each of said compartments operative in response to the effect on said fluid of oscillating Coriolis forces at said spin frequency to derive oscillatory electrical signals at said spin frequency of amplitude and phase functionally related to the angular rate of rotation of said spin axis with respect to inertial space.

27. Apparatus for measuring the angular rate of rotation of a body with respect to inertial space comprising, a rotor adapted to be supported on said body for rotation at a spin frequency about a spin axis having a fixed relationship with said body, said rotor being formed with four substantially identical compartments containing fluid, said compartments being arranged in two groups, each group being arranged in a symmetric pattern about said spin axis and angularly displaced from each other about said spin axis, at least one transducer in each of said compartments operative in response to the effect on said fluid due to rotation of said spin axis with respect to inertial space to generate ocillatory signals at said spin frequency, and circuit means carried on said rotor for combining and modulating the electrical signals from said transducers.

28. Apparatus for measuring the angular rate of rotation of a body with respect to inertial space comprising, a rotor adapted to be supported on said body for rotation at a spin frequency about a spin axis having a fixed relationship with said body, said rotor being formed with four substantially identical compartments containing fluid, said compartments being arranged in two groups oriented in space quadrature, each group being arranged in a symmetric pattern about said spin axis, at least one transducer in each of said compartments operative in response to the effect on said fluid due to rotation of said spin axis with respect to inertial space to generate oscillatory signals at said spin frequency of phase and amplitude functionally related to the angular rate of rotation of said spin axis with respect to inertial space, circuit means carried on said rotor for combining and modulating the electrical signals from said transducers, and means for coupling the amplified resultant signal from said rotor.

29. Apparatus for measuring the angular rate of rotation of a body with respect to inertial space comprising, a rotor adapted for rotation at a substantially constant spin frequency about a spin axis having a fixed relationship with said body, said rotor being formed with four compartments oriented in space quadrature about said spin axis, said compartments being filled with fluid, a transducer at each end of each said compartment operative in response to compounds of pressure within said fluid due to rotation of said spin axis with respect to inertial space to generate oscillatory signals at said spin frequency having amplitude and phase functionally related to the angular rate of rotation of said spin axis with respect to inertial space, which signals may include components due to vibration of the rotor about axes perpendicular to said spin axis, circuit means mounted on said rotor including phase-shifting means for adding in phase the components of said signals due to rotation of said spin axis with respect to inertial space and for canceling the components of said signals due to vibration of said rotor about axes perpendicular to said spin axis, and means on said rotor for modulating the resultant signal.

30. In gyroscopic apparatus, a power driven rotor adapted for rotation at a substantially constant spin frequency about a spin axis, said rotor being formed with four compartments oriented in space quadrature about said spin axis, said compartments being filled with fluid, at least one transducer in each of said compartments operative in response to components of pressure within said fluid due to rotation of said spin axis with respect to inertial space to generate oscillatory electrical signals at said spin frequency, which signals may include components due to vibration of said rotor about axes perpendicular to said spin axis, and circuit means on said rotor including phase-shifting means for adding in phase the components of said signals due to rotation of said spin axis with respect to inertial space and for canceling the components of said signals due to vibration of said rotor.

31. In apparatus for measuring the angular rate of rotation of a body with respect to inertial space, a rotor adapted to be supported on said body for rotation at a fixed spin frequency about a spin axis having a fixed relationship to said body, said rotor being formed with at least one compartment displaced from said spin axis, said compartment being filled with a first fluid, at least one transducer supported on said rotor nearer said spin axis than said compartment, a channel filled with a second fluid connected between said compartment and said transducer, said transducer being op;erative in response to the effect on said fluids produced by oscillating Coriolis forces due to rotation of said spin axis with respect to inertial space to produce oscillatory electrical signals at said spin frequency, said fluids having density characteristics so related to the dimensions of said compartment and channel as to be mechanically resonant at said spin frequency to thereby produce an amplification of said signals.

References Cited in the file of this patent
UNITED STATES PATENTS

| | | |
|---|---|---|
| 1,890,831 | Smyth | Dec. 13, 1932 |
| 2,605,093 | Dorand | July 29, 1952 |
| 2,716,893 | Birdsall | Sept. 6, 1955 |